United States Patent
Woerner et al.

[11] Patent Number: 5,882,174
[45] Date of Patent: Mar. 16, 1999

[54] SYSTEM FOR LOADING OR UNLOADING OF PARTS ONTO OR FROM TRAYS

[75] Inventors: Klaus D. Woerner, Cambridge; Michael A. Cybulski, Kitchener; Donald J. Mowat, Roseville, all of Canada

[73] Assignee: ATS Automation Tooling Systems Inc., Cambridge, Canada

[21] Appl. No.: 766,352

[22] Filed: Dec. 13, 1996

Related U.S. Application Data

[60] Provisional application No. 60/008,712, Dec. 15, 1995.

[51] Int. Cl.$^6$ .................................................. B65G 57/00
[52] U.S. Cl. .................. 414/788.7; 414/801; 414/795.8; 414/796.7; 414/796.9; 414/793.4
[58] Field of Search ...................................... 414/331, 340, 414/391, 392, 395, 416, 788.7, 788.8, 793.5, 795.8, 796.7, 796.9, 796.5, 793.4, 609, 751, 801

[56] References Cited

U.S. PATENT DOCUMENTS

| | | | |
|---|---|---|---|
| 3,181,712 | 5/1965 | Von Gal, Jr. | 414/788.8 |
| 3,258,808 | 7/1966 | Ashford | 414/416 |
| 3,448,867 | 6/1969 | Raynor et al. | 414/788.8 |
| 4,108,061 | 8/1978 | Bowser | 414/927 |
| 4,541,762 | 9/1985 | Tischler et al. | 414/788.7 |
| 4,687,403 | 8/1987 | Motoda | 414/788.7 |
| 4,808,057 | 2/1989 | Chiappe et al. | 414/331 |
| 4,946,340 | 8/1990 | Murphy et al. | 414/416 |
| 5,007,785 | 4/1991 | Van Der Schoot | 414/331 |
| 5,190,434 | 3/1993 | Miura et al. | 414/416 |
| 5,203,666 | 4/1993 | Mojden et al. | 414/416 |

FOREIGN PATENT DOCUMENTS

| | | | |
|---|---|---|---|
| 4-144837 | 5/1992 | Japan | 414/416 |

*Primary Examiner*—David A. Bucci
*Assistant Examiner*—Thuy V. Tran
*Attorney, Agent, or Firm*—R. Craig Armstrong

[57] ABSTRACT

The system is for loading or unloading parts onto or from trays. The same system may be used for either function. A stack of trays loaded on a cart is wheeled into a first cart docking bay. A second cart is positioned in a second cart docking bay beside the first bay, to receive processed trays. A first tray elevator lifts the first cart and trays, or just the trays, to align the uppermost tray with a tray singulator and clamping mechanism. The tray is singulated, i.e. first supported at a lip by retractable opposing support rails and then separated from the stack by operation of the elevator to lower the tray stack, and is then clamped in a precise position. It is subsequently unclamped and shuttled laterally into alignment above the second cart, onto identical retractable support rails, where it is similarly clamped in a precise position. The next tray is then raised by the first elevator and singulated and clamped in position, so that there are then two precisely positioned trays, one above each cart and tray stack. A robot loads or unloads parts onto or from trays at either location, transferring the parts from or to a target location, such as a pallet on a conveyor passing through the system, for example. This loading or unloading takes place primarily at the shuttled tray. When the shuttled tray is completely filled or emptied as the case may be, it is unclamped, the second elevator is lifted to provide support for the tray, the singulator mechanism is opened to release the tray, and the tray stack is lowered, thus clearing the way for the next tray to be shuttled across. While the filled or emptied tray is being lowered, the robot can transfer parts to or from the tray above the first stack, thereby minimizing delays in the cycle.

7 Claims, 17 Drawing Sheets

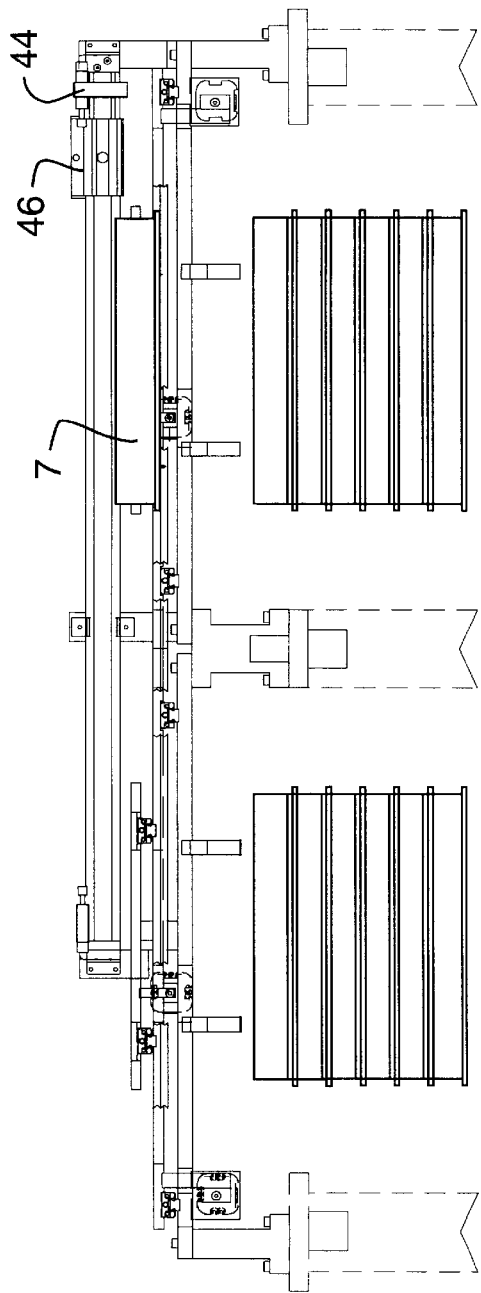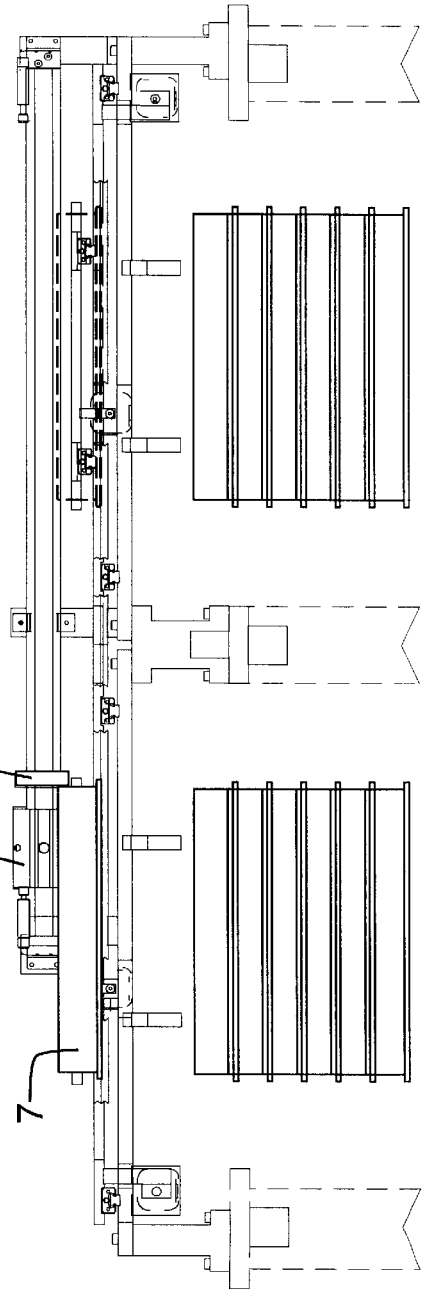
FIG. 16
FIG. 17

SYSTEM FOR LOADING OR UNLOADING OF PARTS ONTO OR FROM TRAYS

REFERENCE TO RELATED APPLICATION

This is a formal application, based on and claiming the benefit of provisional application No. 60/008,712, filed Dec. 15, 1995.

BACKGROUND OF THE INVENTION

This invention relates to automated handling of parts in an automated production system, either for loading the parts onto trays, or unloading the parts from the trays.

As one example, parts may be supplied on trays, and there may be a need to transfer those parts automatically from the trays to another location, such as to pallets which are conveyed past the unloading station. In the reverse situation, parts may arrive at a work station, from a manufacturing operation for example, and may then have to be automatically loaded onto trays for transportation to another location, whether elsewhere in the same factory, or at some remote location. There may be one part on the tray, or many parts, each at a specific location on the tray, which may be predefined or which could be detected by a vision system which is not itself part of the invention.

SUMMARY OF THE INVENTION

In view of the above, it is an object of the invention to provide an efficient system for either loading or unloading parts onto or from trays. The same system may be used for either loading or unloading.

In the invention, a stack of trays loaded on a cart is wheeled into a first cart docking bay. An empty cart is positioned in a second cart docking bay beside the first bay, to receive processed trays. A first tray elevator lifts the first cart and trays, or just the trays, to align the uppermost tray with a tray singulator and clamping mechanism. The tray is singulated, i.e. first supported at a lip by retractable opposing support rails and then separated from the stack by operation of the elevator to lower the tray stack, and is then clamped in a precise position. It is subsequently unclamped and shuttled laterally into alignment above the second cart, onto identical or at least generally identical retractable support rails, where it is similarly clamped in a precise position. The next tray is then raised by the first elevator and singulated and clamped in position, so that there are then two precisely positioned trays, one above each cart and tray stack. A robot loads or unloads parts onto or from trays at either location, transferring the parts from or to a target location, such as a pallet on a conveyor passing through the system, for example. This loading or unloading takes place primarily at the shuttled tray. When the shuttled tray is completely filled or emptied as the case may be, it is unclamped, the second elevator is lifted to provide support for the tray, the singulator mechanism is opened to release the tray, and the tray stack is lowered, thus clearing the way for the next tray to be shuttled across. While the filled or emptied tray is being lowered, the robot can transfer parts to or from the tray above the first stack, thereby minimizing delays in the cycle.

In the preferred embodiment of the invention, trays are always brought into the first cart bay and removed from the second cart bay after processing. When the second cart is full of processed trays, the operator is signalled to remove the cart and replace it with an empty cart. Meanwhile, loading or unloading can continue from one or both trays clamped in position above. In an alternative embodiment of the invention, trays can be brought into either cart bay, with processed trays being stacked on the other cart. That is, the tray flow could be in the opposite direction, or could reverse periodically or with each cycle. In this alternative embodiment, while the last tray from one cart is being processed, a full cart can be positioned in the other bay.

If the system is used to load trays rather than unload them, the same principle is used, but the robot fills the trays rather than emptying them, as they cycle through the system.

BRIEF DESCRIPTION OF THE DRAWINGS

The invention will now be described in detail with reference to the accompanying drawings of the preferred embodiment, in which:

FIGS. 16 and 17 are side views showing the transfer of the tray as in FIG. 15.

DETAILED DESCRIPTION

Figure 1:
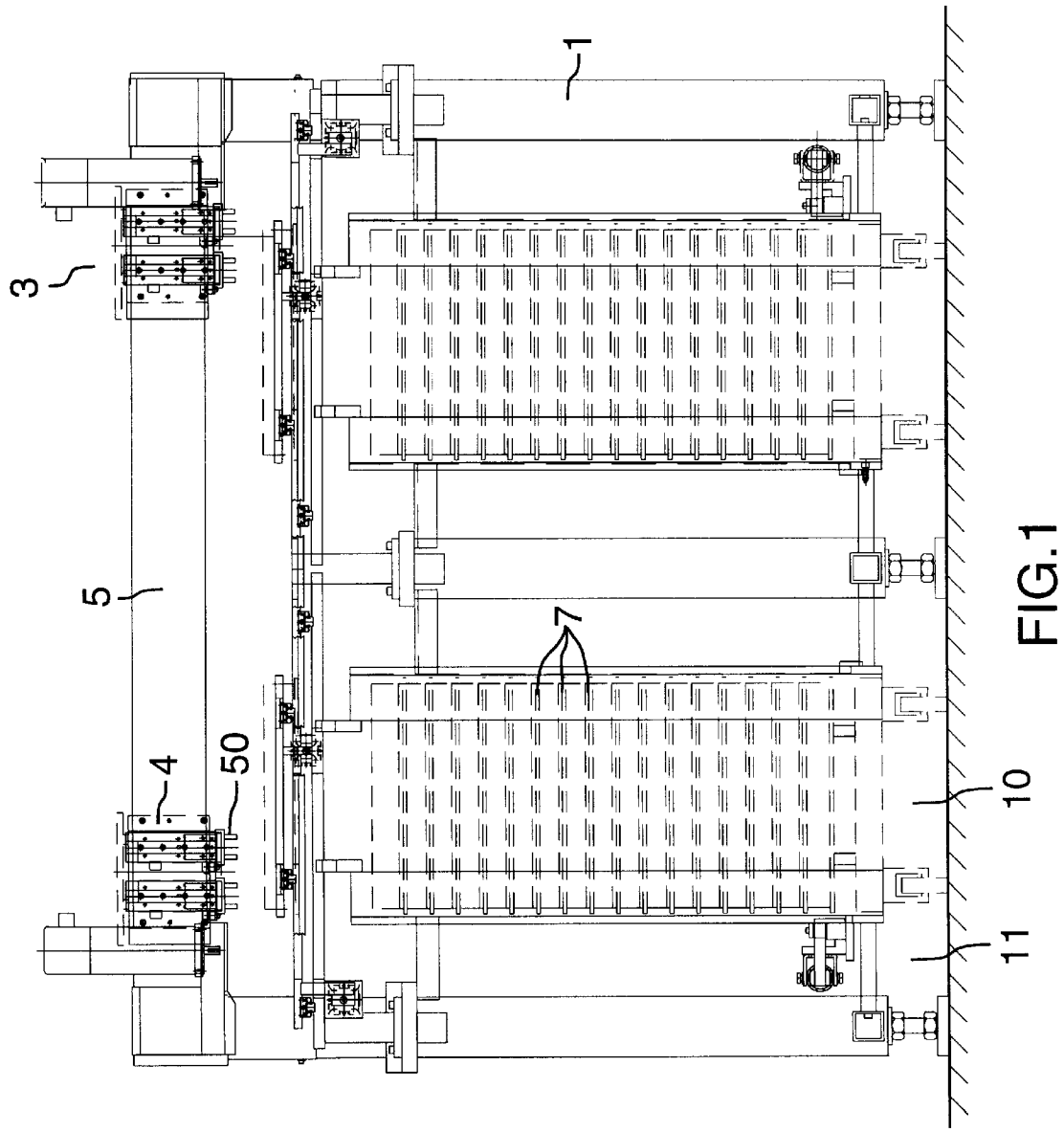
FIG. 1 is a front elevation view of the system.
Figure 2:
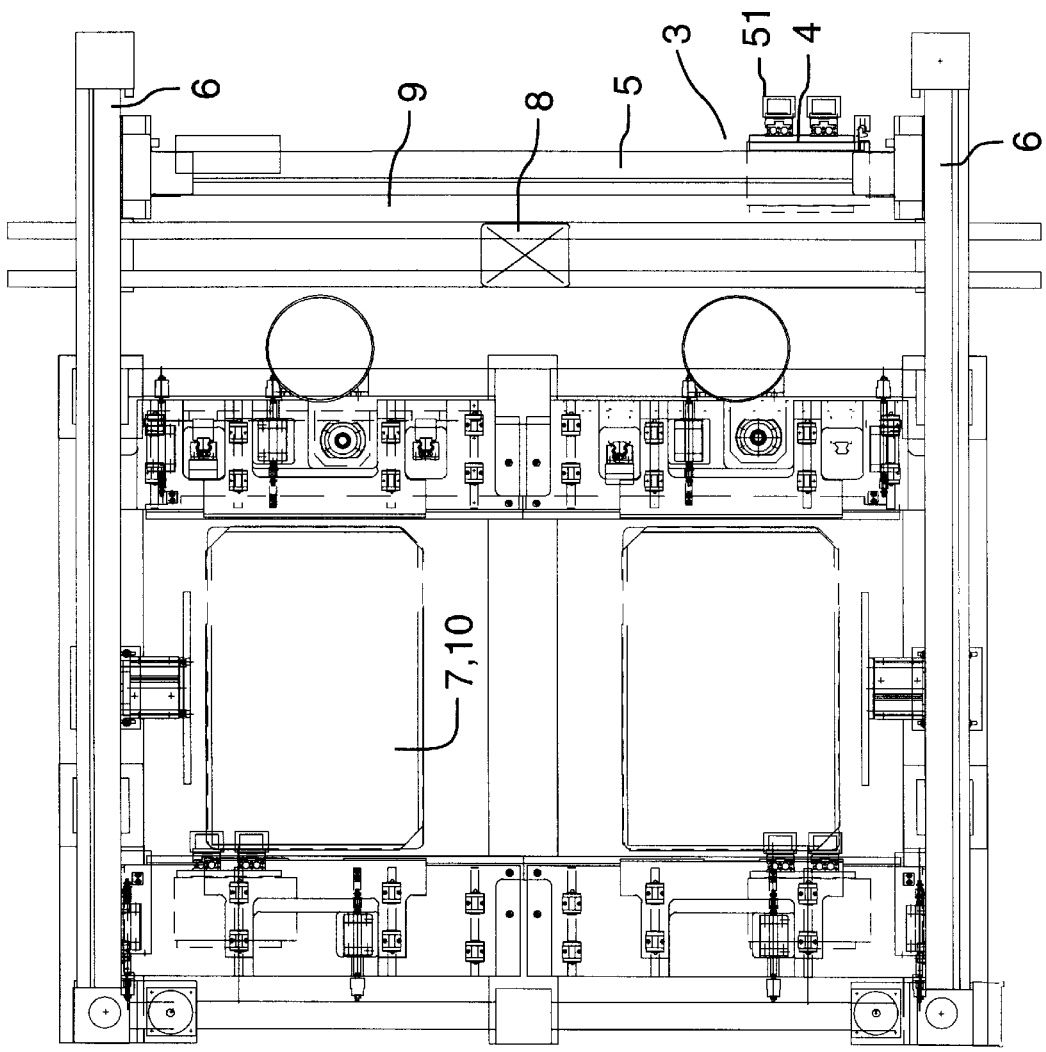
FIG. 2 is a top view of the system.
Figure 3:
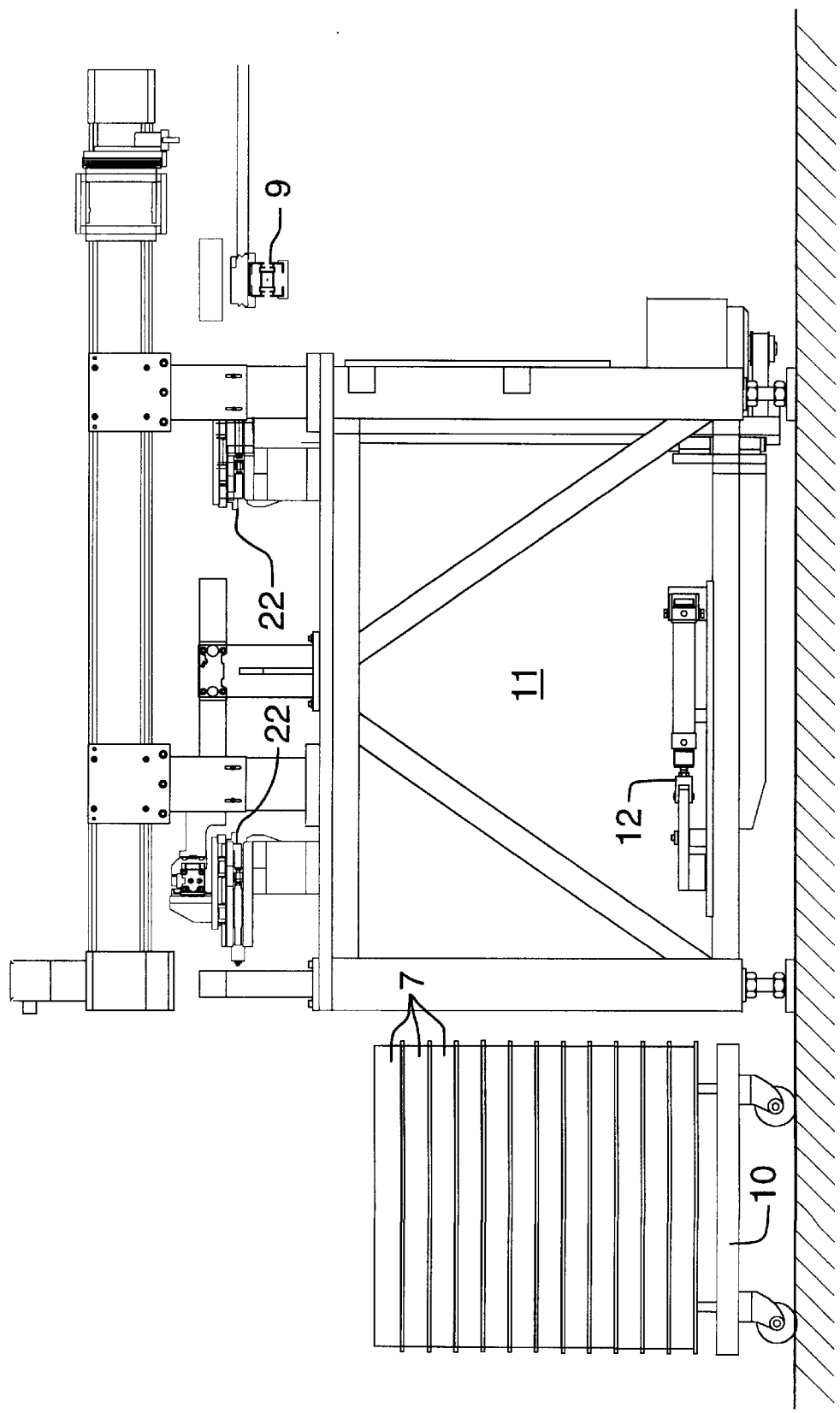
FIG. 3 is a side elevation view of the system.

The system includes a frame 1 onto which the system components and a robot 3 are mounted. It should be stated immediately that the specific configuration of the system is not essential to the invention, nor is the configuration and type of robot. The robot in the preferred embodiment has an end effector 4 which is moveable along a beam 5. The beam is in turn moveable along opposing rails 6, such that the end effector is therefore positionable in the x-y plane. The end effector incorporates a gripper 50 on an element 51 which is moveable vertically relative to the end effector, i.e. in the z-axis. The gripper is thus fully positionable in three dimensions within the operating envelope of the robot.

As mentioned above, the system can be used for loading or unloading parts onto or from trays. For convenience, further details of the system will be described in the context of the system as used for unloading parts from trays 7, but it should be clear that the invention is the same whether for loading or unloading.

In unloading a tray, the robot 3 takes parts from a tray, and deposits them elsewhere within its envelope, such as onto a pallet 8 indexed against a stop (not shown) on a conveyor 9 which passes through the system.

Figure 4:
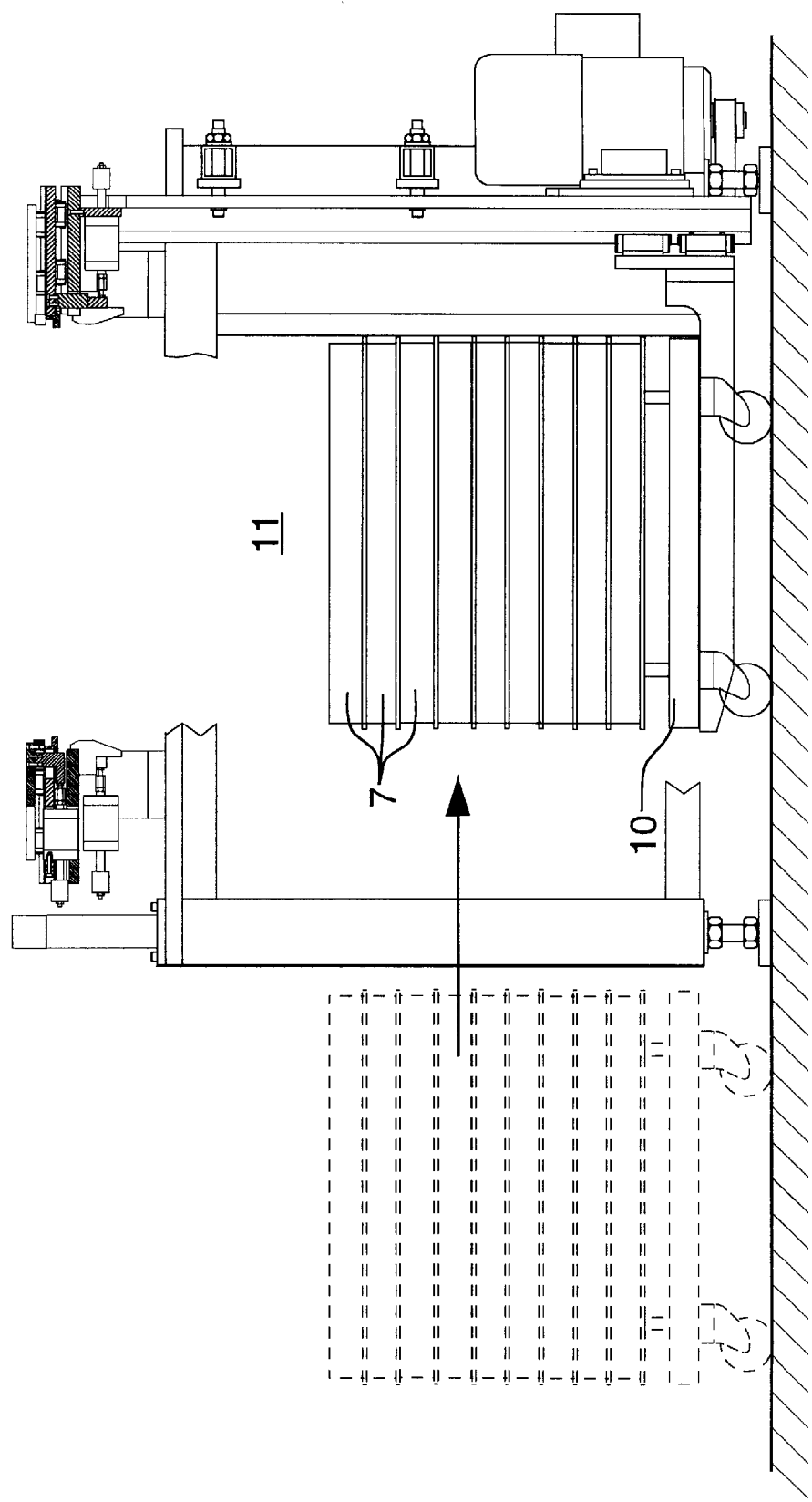
FIG. 4 is a side elevation view of the system, showing a cart being positioned into one of the cart bays.
Figure 5:
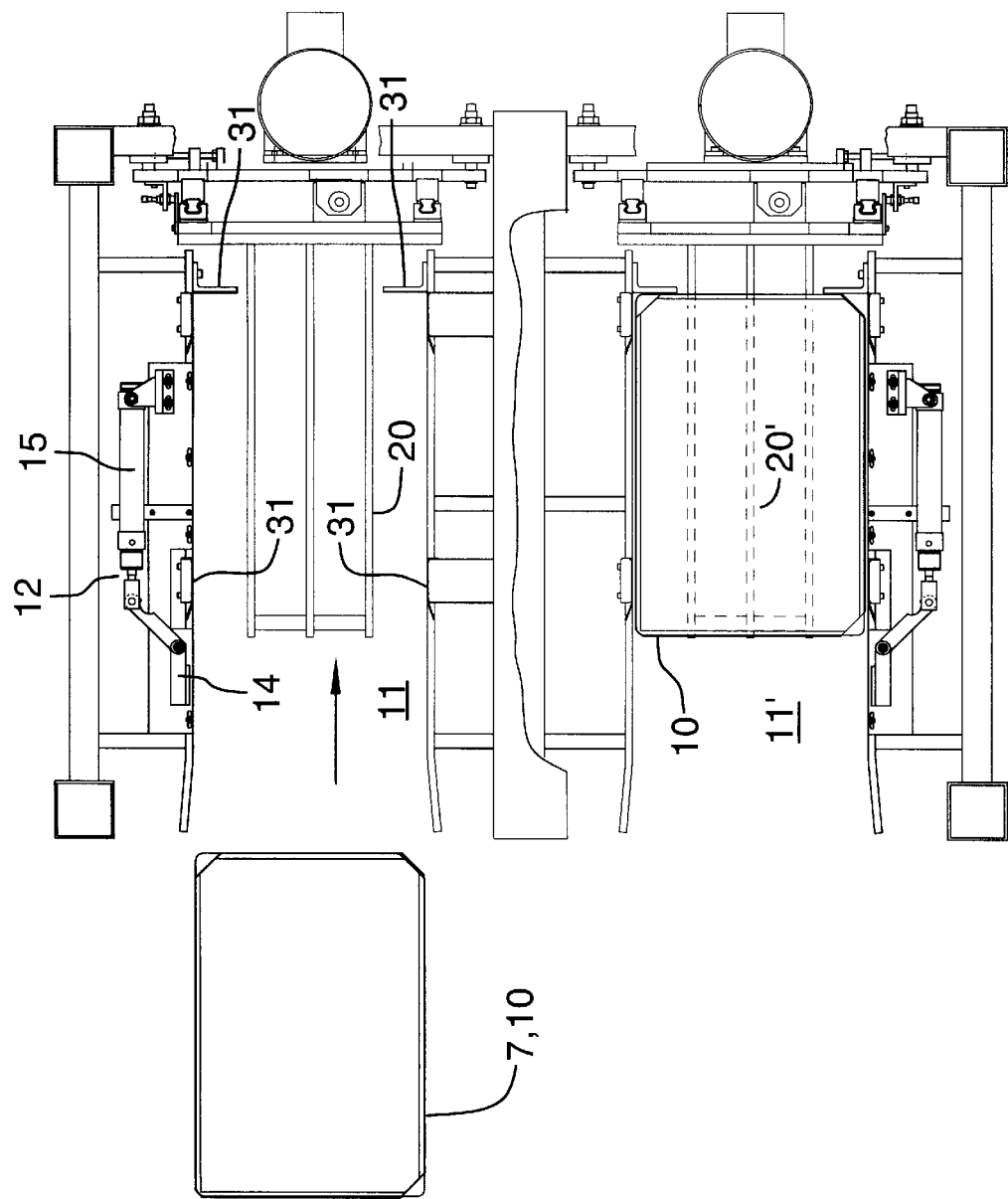
FIG. 5 is a top view of the cart bays.
Figure 6:
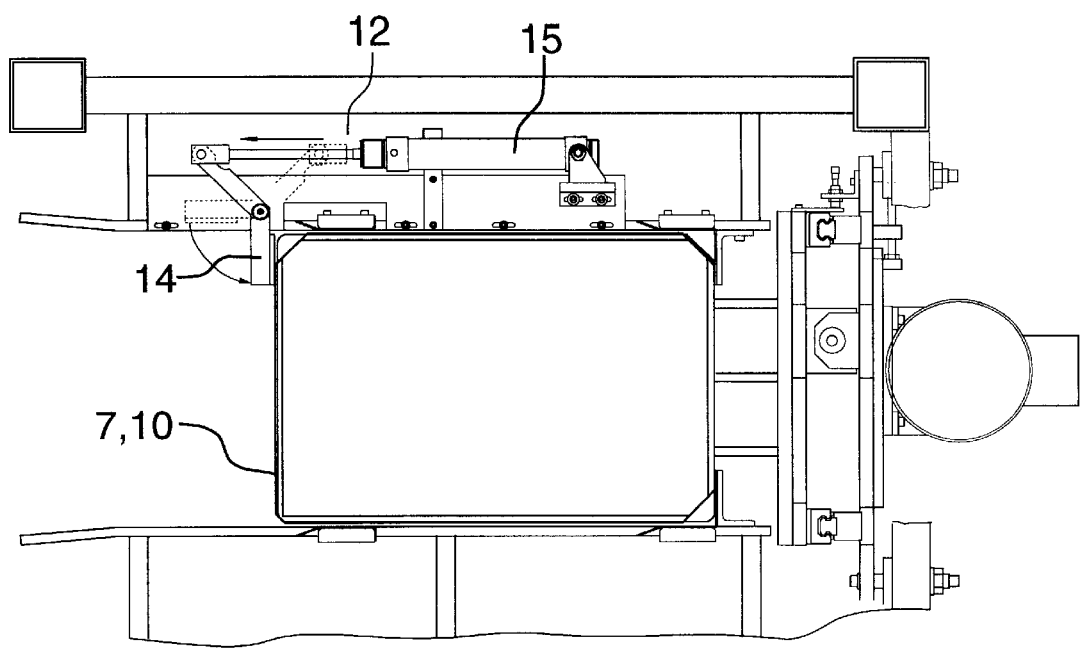
FIG. 6 is top view of one of the cart bays, showing activation of a cart locator mechanism prior to elevating the cart.

A stack of part-bearing trays 7 loaded on a device such as a cart 10 is wheeled into or otherwise positioned in the first cart docking bay 11, as shown in FIGS. 4–6. The cart preferably is positioned reasonably accurately by a cart locator mechanism 12 which is triggered by an operator, or which could be automatically activated by a sensor indicating that a cart has been wheeled into its approximate position. The cart locator mechanism in the preferred embodiment includes a pivoting arm 14 which is actuated by means such as a pneumatic cylinder 15. FIG. 6 shows the closing of the cart locator mechanism after the cart is in position. Initially, an empty cart is positioned in a second cart docking bay 11' beside the first bay. The second bay is essentially identical to the first bay.

Figure 7:
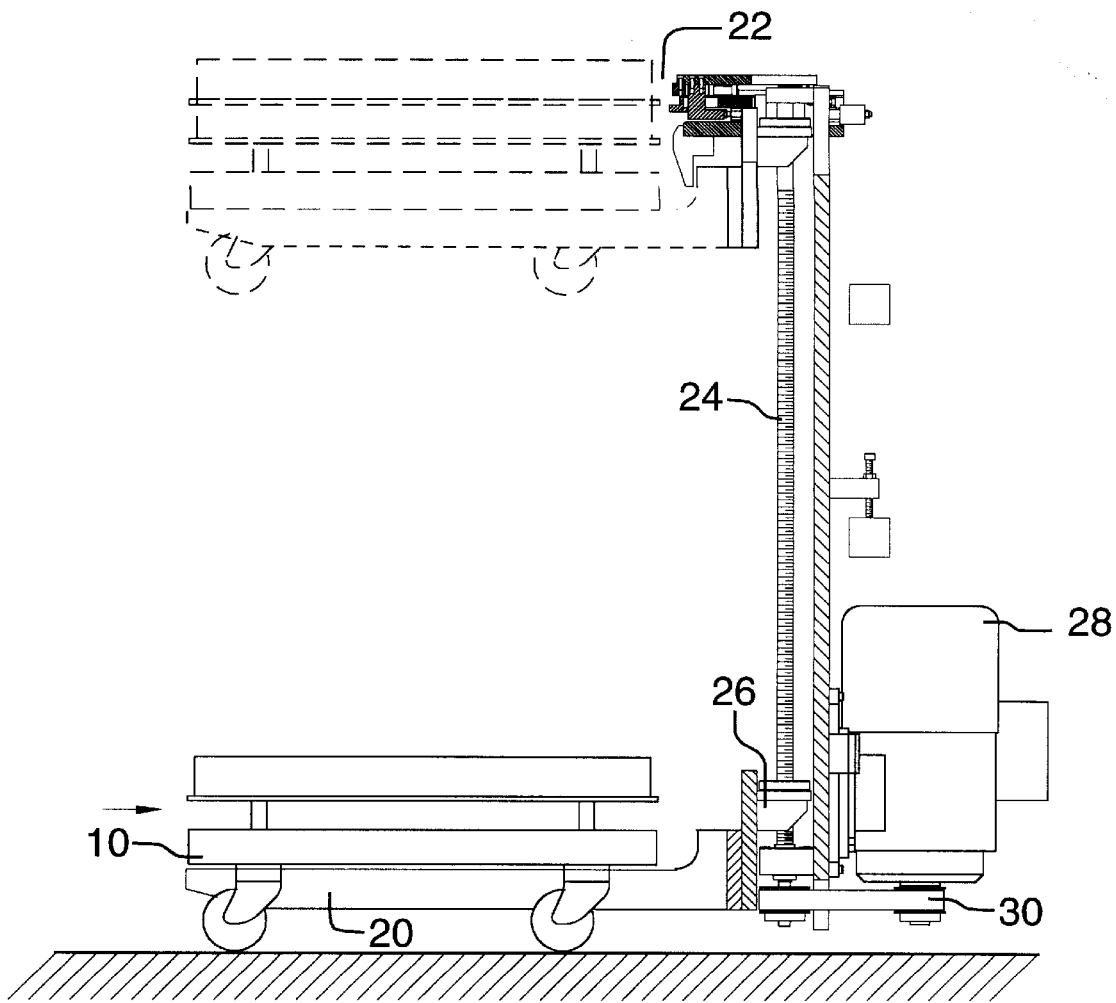
FIG. 7 is a side view showing the elevator mechanism.

As shown in FIG. 7, a first elevator 20 lifts the first cart with its stack of full trays, to bring the uppermost tray up to the level of a tray "singulator" and clamping mechanism 22, which is used to de-nest the tray from other trays and to clamp the tray in the desired position for unloading. The cart locator mechanism is opened as the elevator lifts the cart. The elevator is driven by any suitable means, such as by rotation of a ballscrew 24 through a ballnut 26 to which the elevator is secured. Rotation of the ballscrew is provided by a motor 28 which drives a belt 30, for example. Tray stack guides 31, seen in FIG. 5, are preferably used to keep the trays in general alignment as they are moved by the elevator.

Figure 18:
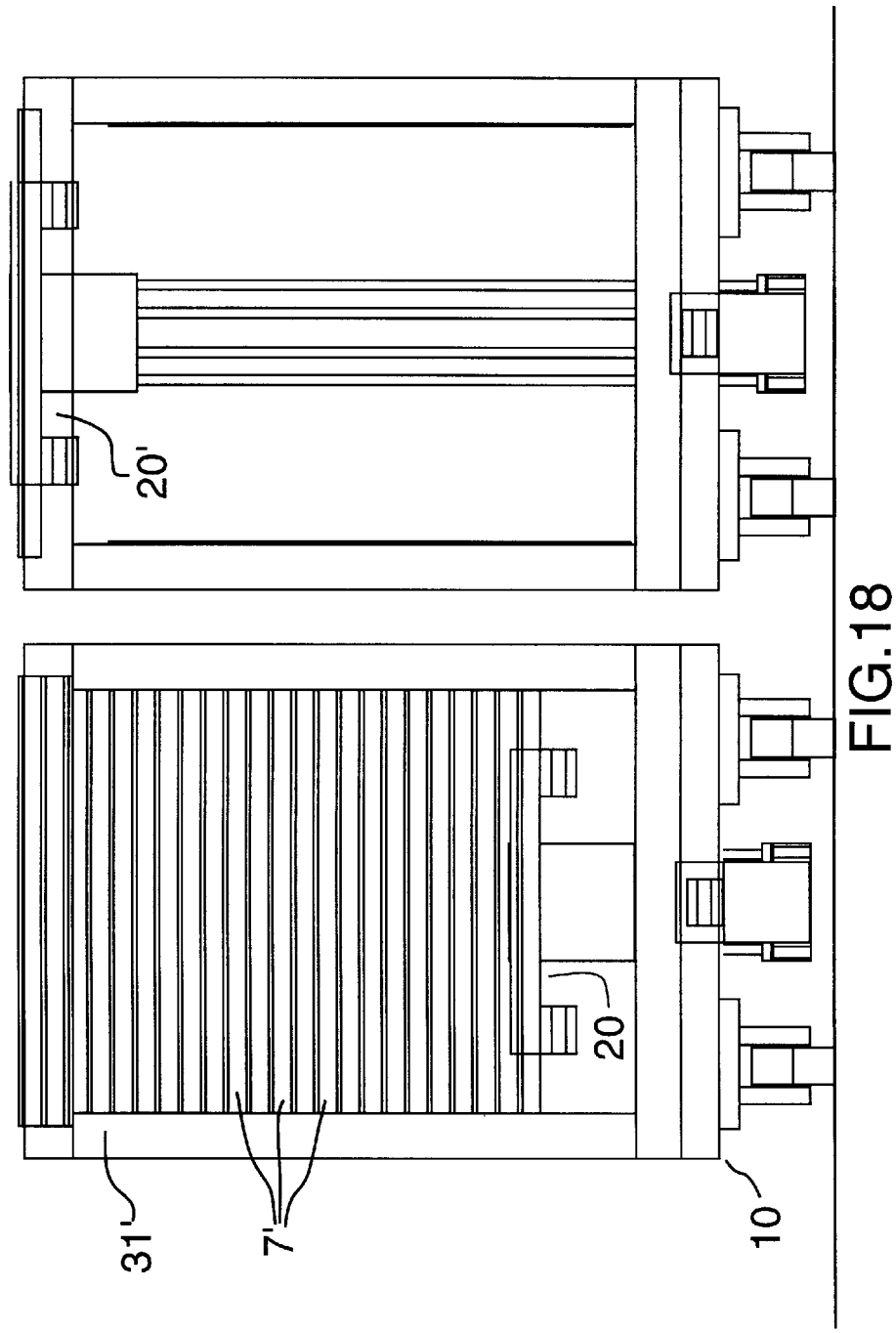
FIG. 18 is a front elevation view showing an alternative in which only trays are lifted by the elevator, instead of lifting the entire cart.

Alternatively, as shown in FIG. 18, the elevator 20 can be used to lift the trays only, with the carts remaining on the ground, secured by the cart locator mechanism. In this alternative, the carts are provided with an opening to allow entry of the elevator, and the carts themselves are preferably provided with the tray stack guides 31'. (Note that FIG. 18 is from an early embodiment of the invention, so its details do not match those of the remaining drawings.)

For greater clarity of illustration, FIG. 7 does not show a full cart. A sensor (not shown) detects when the uppermost tray reaches the proper height for singulation. Another sensor (also not shown) detects when the last tray is at the top, i.e. when the cart is about to be emptied, by detecting and suitable indicator such as the height of the elevator.

Figure 8:
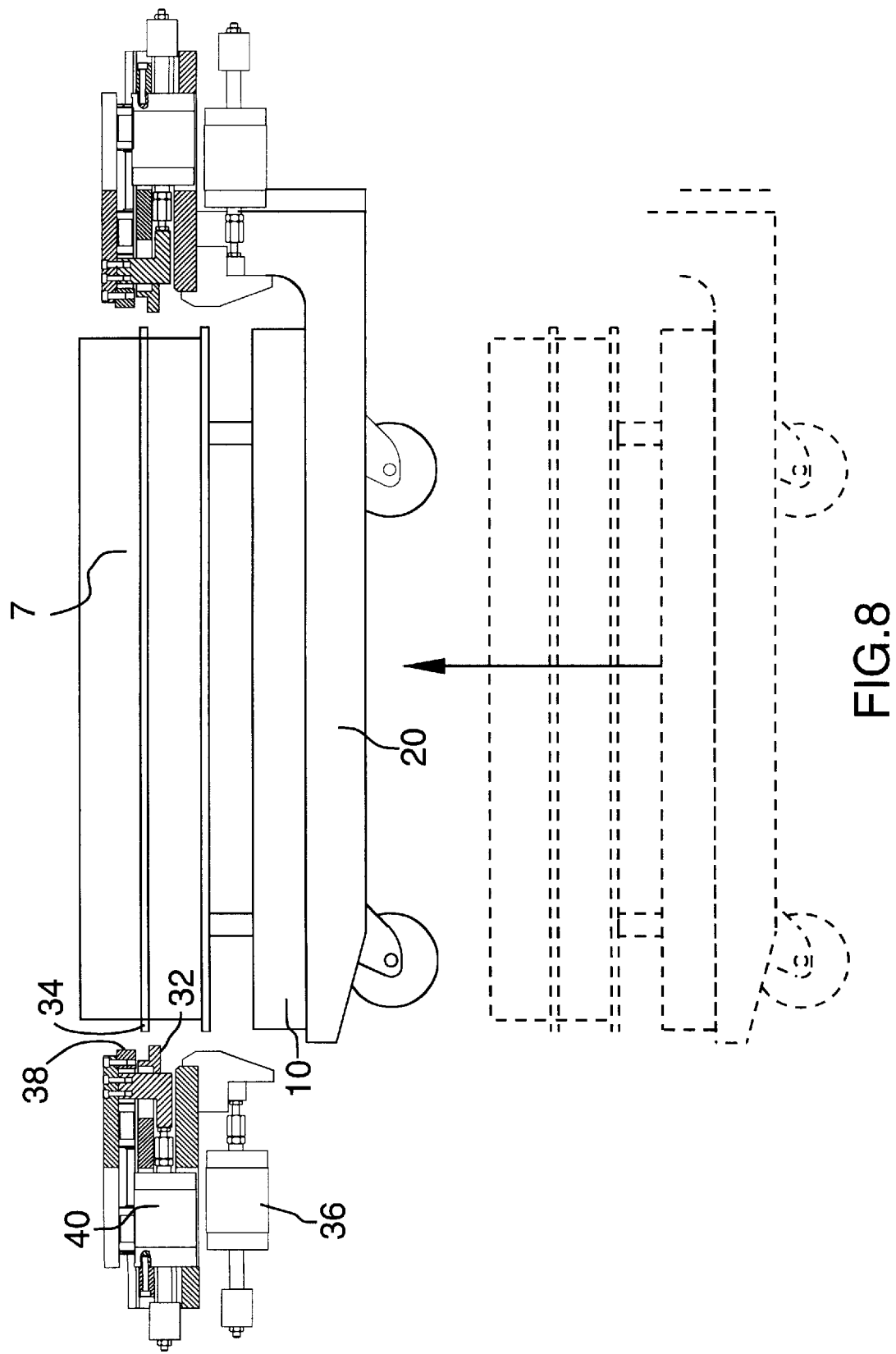
FIG. 8 is a side view showing a cart raised to position a tray opposite the tray singulating and clamping assembly.
Figure 9:
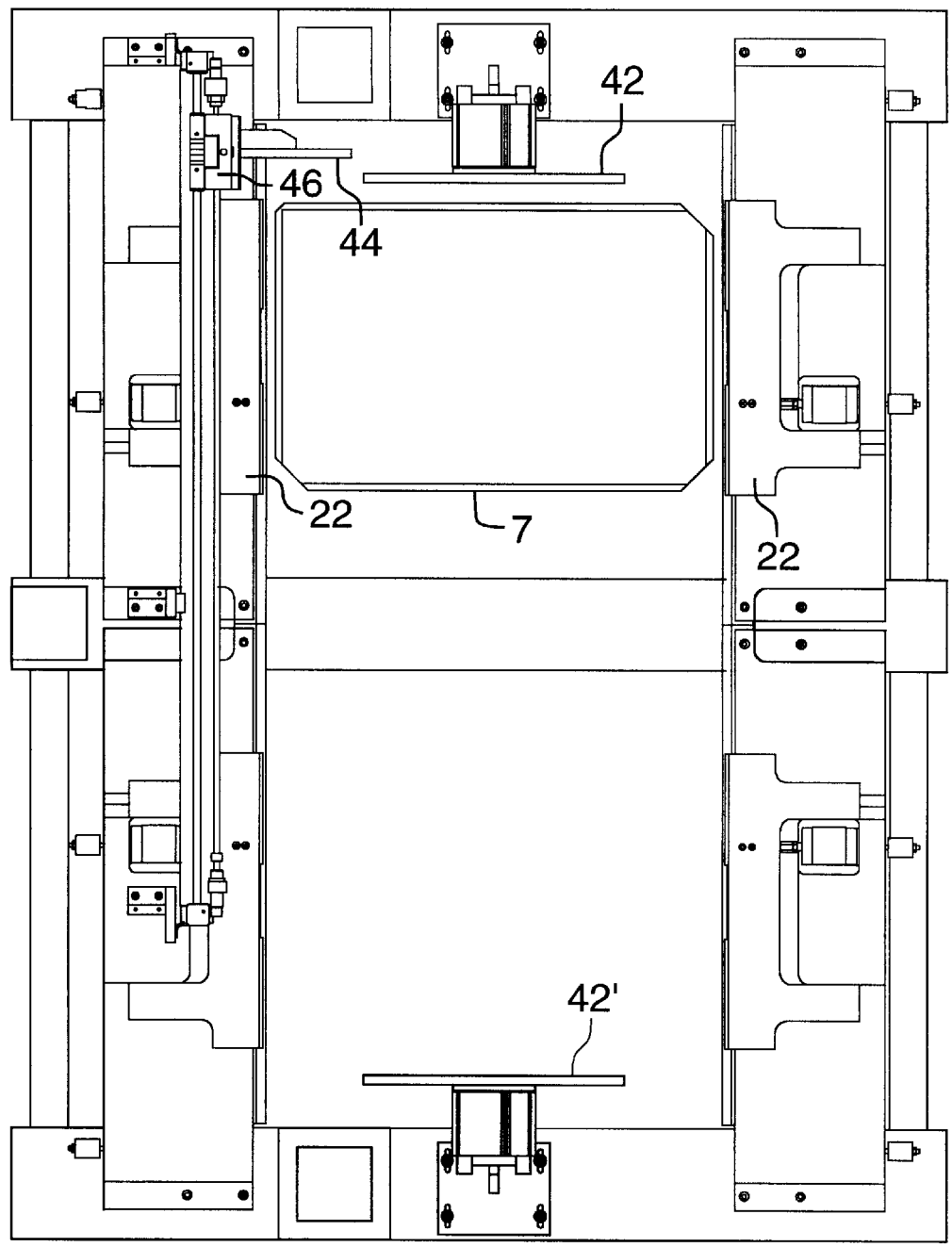
FIG. 9 is a plan view at the same stage as in FIG. 8, i.e. prior to singulating and clamping the uppermost tray.
Figure 10:
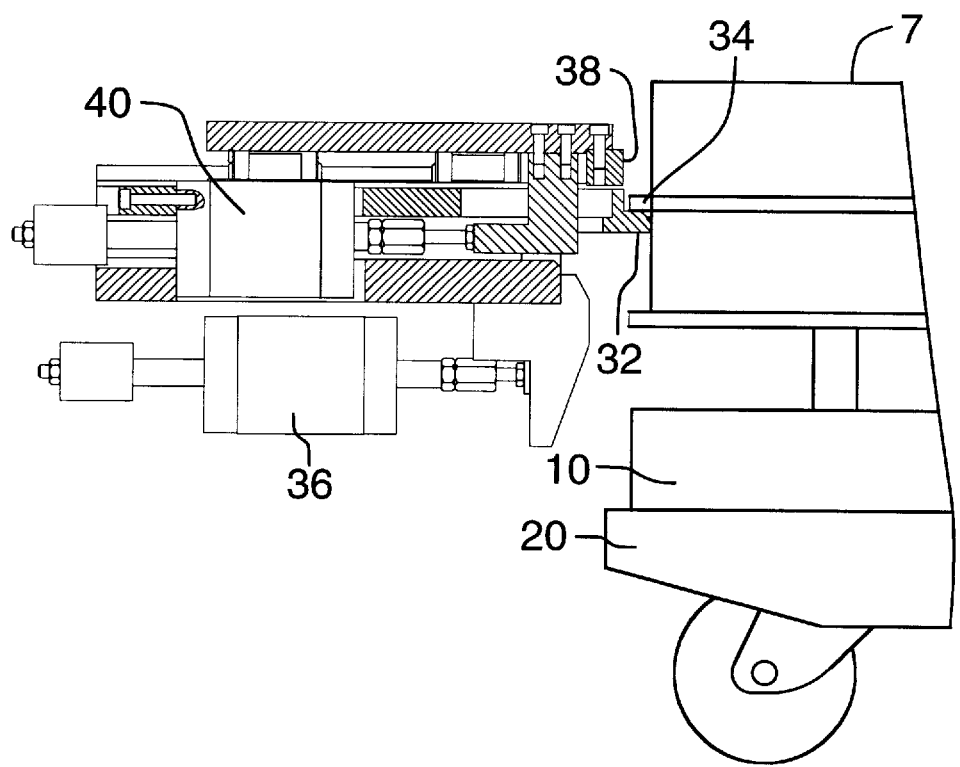
FIG. 10 is a side cross-sectional view showing the singulator mechanism moved in to support the tray.
Figure 11:
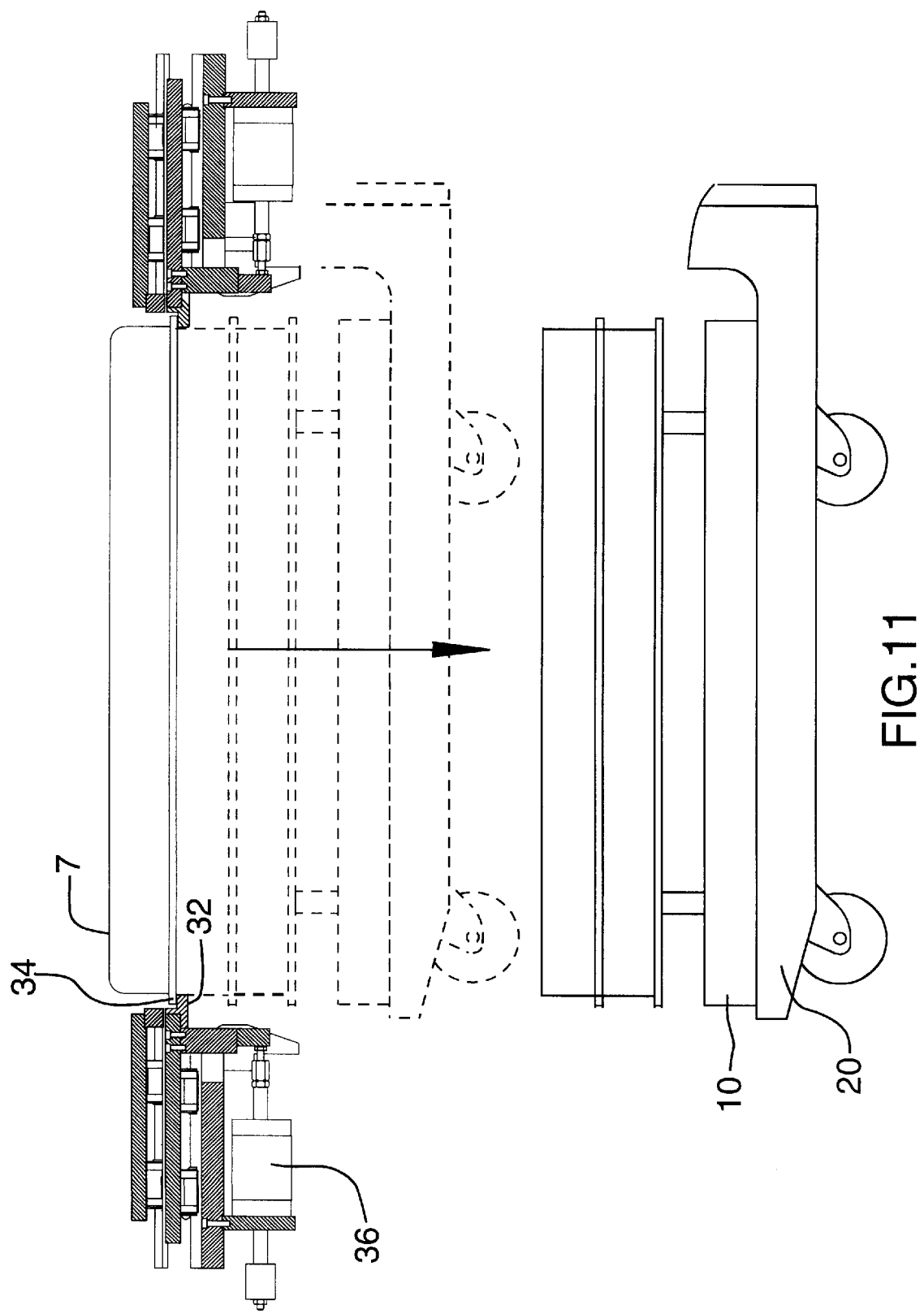
FIG. 11 is a side view showing the elevator then being lowered to "singulate" the uppermost tray, i.e. to de-nest it from the stack of trays.
Figure 12:
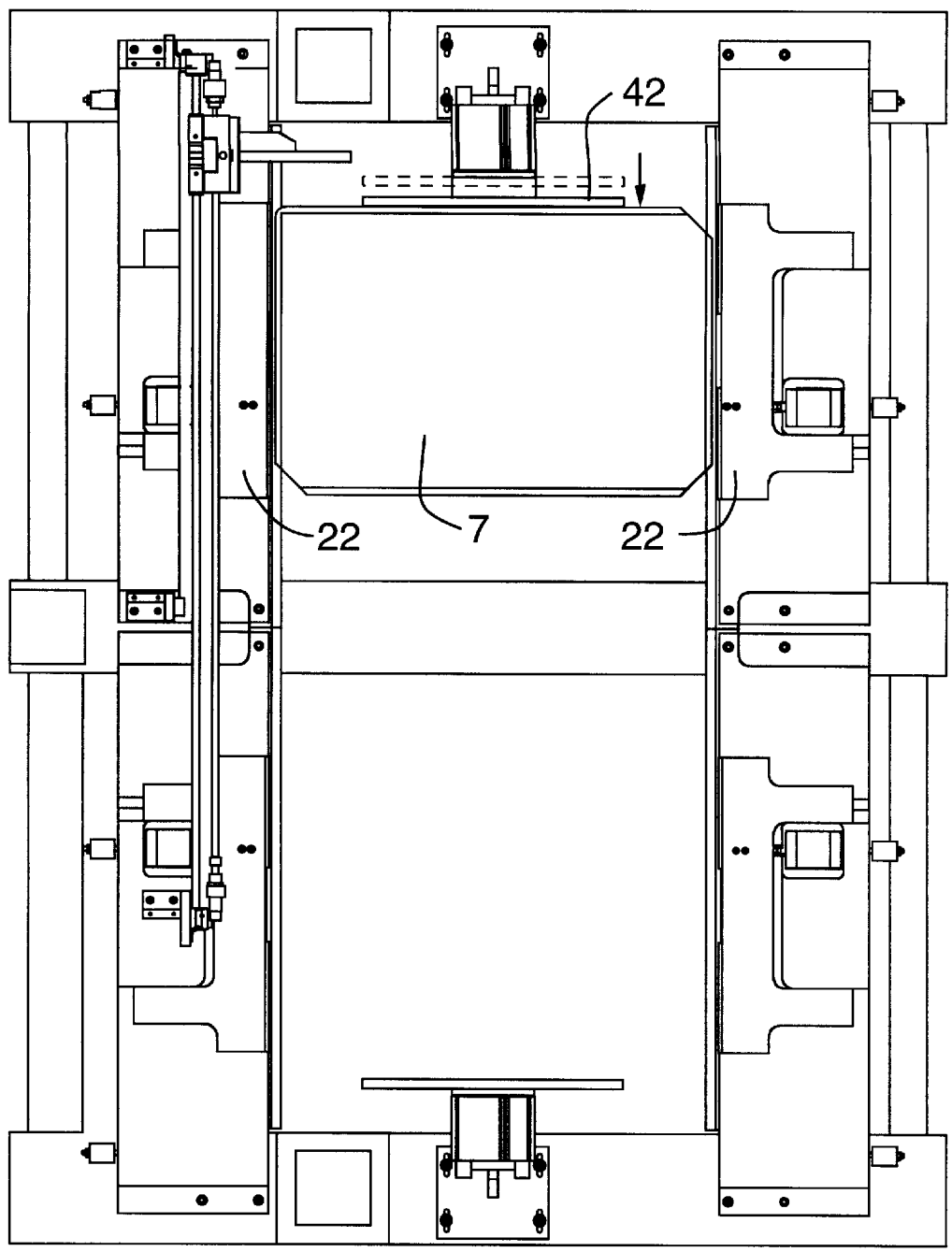
FIG. 12 is a top view showing operation of a moveable end stop to provide precise positioning of the tray prior to clamping.
Figure 13:
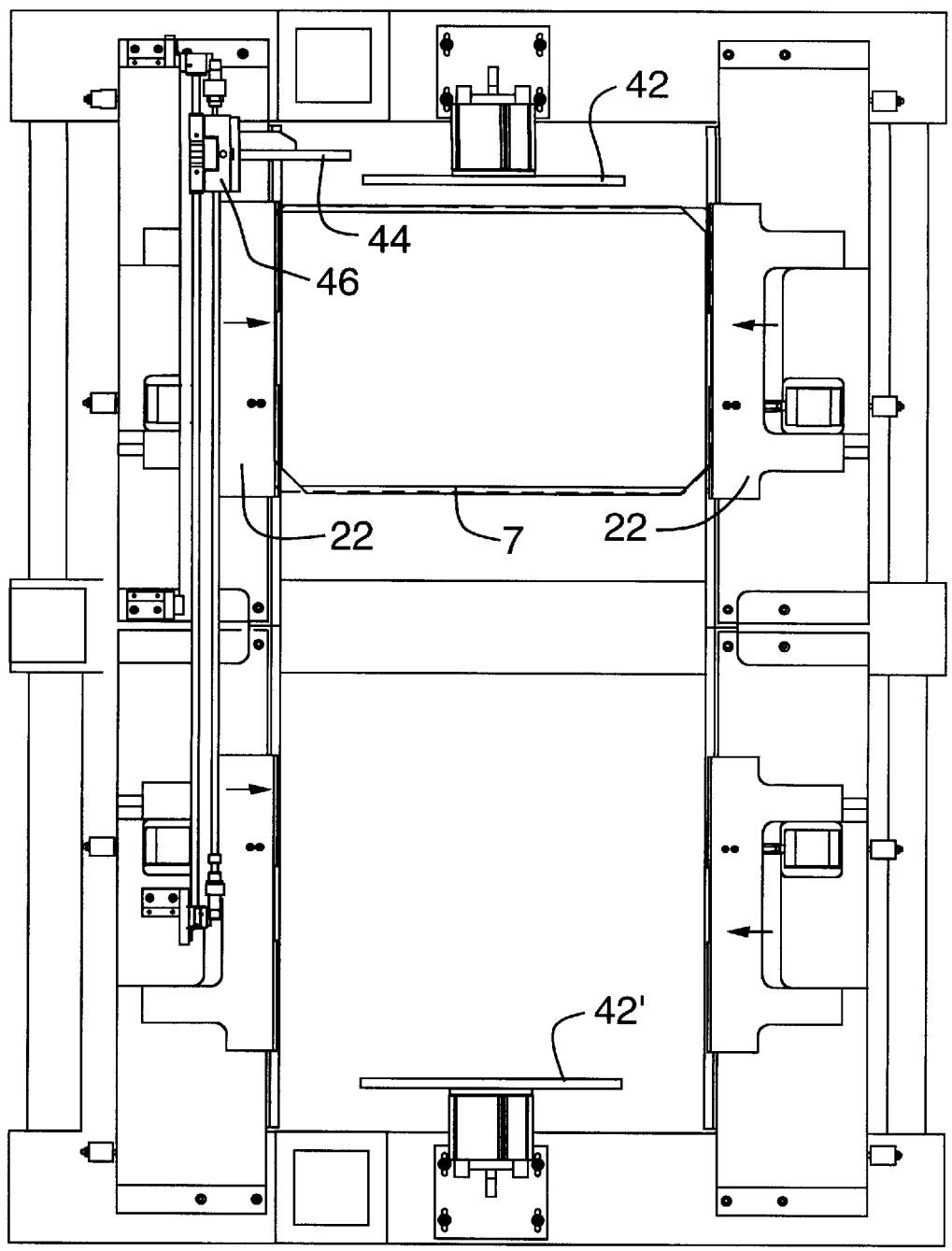
FIG. 13 is a top view showing operation of the clamping means to clamp the tray.
Figure 14:
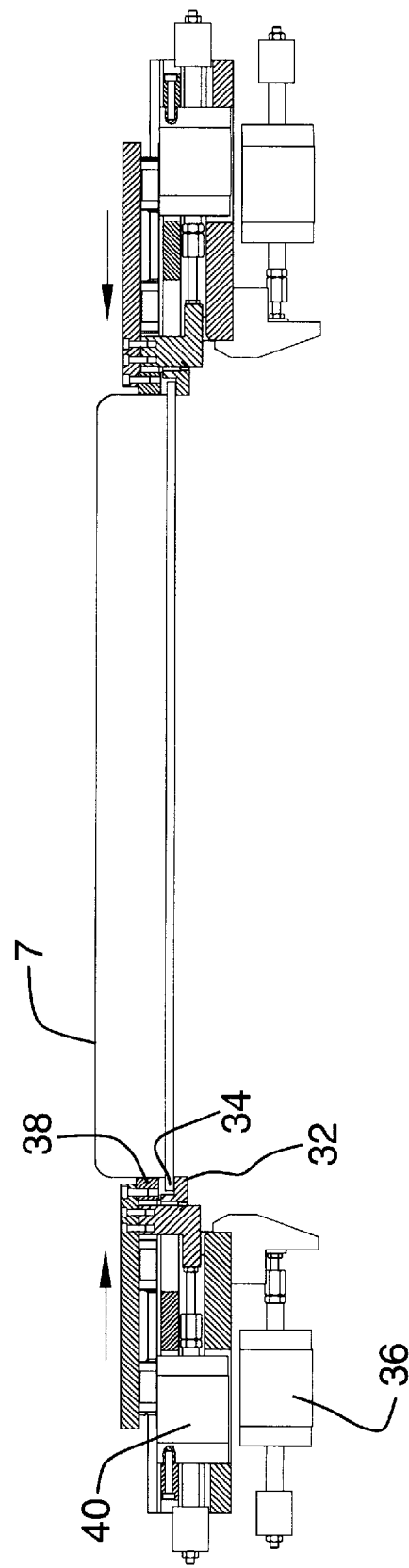
FIG. 14 is a side view showing operation of the clamping means to clamp the tray.

The singulator and clamping mechanism 22, as seen best in FIG. 8 and subsequent drawings, has two opposing support rails 32 which slide in under a lip 34 on the uppermost tray, actuated by a cylinder 36. Each support rail also has a tray clamping bar 38, which is moveable from the support rails towards the tray by means such as a cylinder 40, to clamp and precisely position the tray. The clamping bars may be configured to be above the rails, as shown, or below the rails, depending on the location of the lip on the tray. Before or after clamping takes place, a moveable end stop 42 is actuated to slide the tray along the support rails to a precise lateral position, defined by the stopping point of the end stop. If this occurs after clamping, the force of the end stop is sufficient to overcome the friction from the clamping force. Thus the sequence is that: (1) the opposing support rails move in under the tray lip to support the tray; (2) the elevator drops down, to slightly lower the tray onto the support rails, and to then de-nest the lower trays from the uppermost tray; (3) the moveable end stop is actuated for precise lateral positioning; and (4) the clamping bars are actuated to clamp the tray in its precise x-y location. Steps (3) and (4) may be reversed. FIGS. 8 and 9 show the tray at the right height for singulation, FIG. 10 shows the support rails moved into position under the tray lip, FIG. 11 shows the de-nesting by lowering of the elevator, FIG. 12 shows the precise lateral positioning by operation of the moveable end stop, and FIGS. 13 and 14 show the clamping of the tray. FIGS. 12–14 would obviously vary slightly if clamping takes place prior to operation of the moveable end stop. This sequence is automatically carried out by modern conventional control means.

Figure 15:
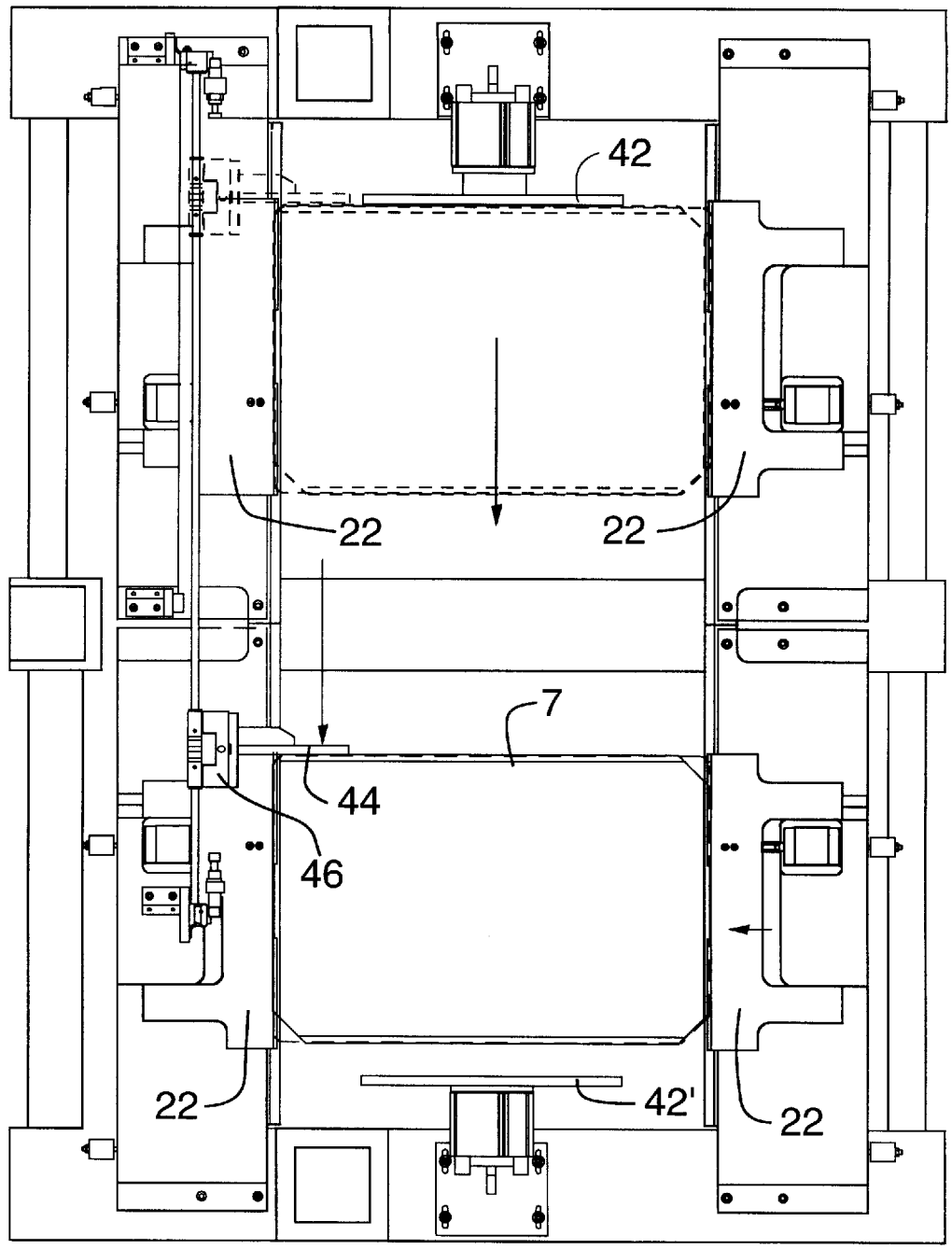
FIG. 15 is a top view showing operation of a rodless cylinder to transfer the tray from one stack to the other.

The tray is subsequently unclamped and shuttled laterally into alignment above the second cart, onto and along identical or at least generally identical retractable support rails 32, where it is similarly clamped in a precise position. Precise positioning is again provided by a moveable end stop 42', either before or after clamping. The shuttling is accomplished by any suitable means such as a shuttle plate 44 attached to a rodless cylinder 46, for example, as shown in FIGS. 15–17. The next tray is then raised by the first elevator and singulated and clamped in its position, so that there are then two precisely positioned trays, one above each cart and tray stack. The robot can thus unload parts from either tray, but for greatest efficiency the unloading takes place primarily at the shuttled tray. When the shuttled tray is completely filled or emptied as the case may be, it is unclamped, the second elevator 20' is lifted to provide support for the tray, the support rails are retracted to provide clearance for the tray, and the tray is lowered, thus clearing the way for the next tray to be shuttled across after returning the support rails. While the tray is being lowered, the robot can unload from the other tray, i.e. the tray above the first stack, to minimize delays in the cycle.

Sensors (not shown) are preferably provided to detect when the second cart is full. An operator is then summoned by an alarm, warning light or other suitable means. Meanwhile, the robot can continue to unload parts from either or both singulated trays. The operator removes the cart with the empty stack of trays, and replaces it with an empty cart.

Similarly, sensors (not shown) are preferably provided to detect when the first cart is empty, so that the operator can be summoned. The operator removes the empty cart and replaces it with a full cart. Meanwhile, processing of parts by the robot can continue uninterrupted.

In general, this system thus provides a high degree of efficiency and flexibility. If desired, some of that flexibility can be removed, of course. For example, the system could be configured to use a smaller robot, i.e. one whose envelope extended over one of the tray stack areas only, if placement or removal of parts was desired from one stack only. This would obviously be less efficient, however, since there would be greater waiting times in the cycle.

In using the system to load parts onto trays, all cycling of the trays is identical to that described above for unloading of parts. The robot on each of its cycles takes a part from a pallet or some other supply, and deposits it onto the tray, instead of the reverse.

Another possibility and an example of the system's flexibility is that the whole system could be mirror-imaged, in effect, such that half of the enlarged system would take parts from trays, and the other half would deposit those parts onto different trays, either in one step via a single large-envelope robot, or by coordinated transfers to a central transfer point, where a machining operation could be carried out for example.

A number of variations on the above will be apparent to those who are knowledgeable in the field of the invention. For example, in one alternative embodiment of the invention mentioned briefly above, the trays can be brought into either cart bay, with tray flow in either direction. In such an embodiment, an additional shuttle plate operable in the opposite direction must be used, but otherwise the system is essentially identical. The same degree of operational efficiency and cycle time minimization likely could not be achieved in such a system, however, although there may be some particular applications for which this bi-directional capability could be advantageous.

Obvious variations on the above are considered to be within the scope of the invention as defined in the following claims.

What is claimed as the invention is:

1. A system for loading or unloading parts onto or from trays, comprising:

a frame defining a first cart bay and an adjacent second cart bay, each for receiving a horizontally transportable cart on which trays are stackable;

an elevator mechanism in each cart bay;

two tray singulating and clamping mechanisms at the same height and aligned with each other, one above each said cart bay, said mechanisms having opposing singulating means for supporting opposite sides of a tray elevated thereto by operation of said elevator and opposing clamping means for clamping said tray, said singulating means being moveable between a retracted position allowing passage of a tray and an actuated position where said tray is supported, said clamping means being similarly moveable between a retracted position allowing passage of a tray and an actuated position where said tray is clamped;

means for transferring an unclamped singulated tray laterally from at least one tray singulating and clamping mechanism towards the other tray singulating and clamping mechanism, and thus from above one cart bay to above the other cart bay;

means for transferring parts between any singulated and clamped tray and another location; and control means programmed to detect horizontal positioning of the transportable cart in one said cart bay, to raise one said elevator to position an uppermost tray opposite said singulator mechanism above said one cart bay, to then actuate said singulating mechanism to support said tray, to then lower said elevator to separate said tray from any remaining trays in that cart bay, to then actuate said clamping mechanism to clamp said tray, to release said clamping mechanism and to actuate said means to transfer said tray laterally when desired to transfer said tray to said other singulator and clamping mechanism, to clamp said tray at said other singulator and clamping mechanism, to then raise the other elevator to the correct height for receiving said tray from the other singulator mechanism, to retract said other singulator mechanism to allow said other elevator to receive said tray from said other singulator mechanism, to then lower said other elevator and actuate said other singulator mechanism to enable it to support the next transferred tray, and to control said transfer of parts between any singulated and clamped tray and another location.

2. A system as recited in claim 1, further comprising at least one moveable end stop moveable between a retracted position and an actuated position, such that movement of said end stop to said actuated position brings it into contact with a singulated tray to move said tray to a precise lateral position.

3. A system as recited in claim 1, where said elevator raises said trays by raising said cart.

4. A system as recited in claim 1, where said elevator raises said trays by lifting said trays from said cart.

5. A system as recited in claim 1, where said means for transferring parts comprises a robot having a gripper positionable within a three-dimensional operating envelope, said operating envelope including the regions of said singulating and clamping mechanisms and thus trays clamped by said mechanisms, and another region for obtaining or receiving parts to be transferred.

6. A method of operating a system for loading or unloading parts onto or from trays, said system comprising:

a frame defining a first cart bay and an adjacent second cart bay, each for receiving a horizontally transportable cart on which trays are stackable;

an elevator in each cart bay;

two tray singulating and clamping mechanisms at the same height and aligned with each other, one above each said cart bay, said mechanisms having opposing singulating means for supporting opposite sides of a tray elevated thereto by operation of said elevator and opposing clamping means for clamping said tray, said singulating means being moveable between a retracted position allowing passage of a tray and an actuated position where said tray is supported, said clamping means being similarly moveable between a retracted position allowing passage of a tray and an actuated position where said tray is clamped;

means for transferring an unclamped singulated tray laterally from at least one tray singulating and clamping mechanism towards the other tray singulating and clamping mechanism, and thus from above one cart bay to above the other cart bay;

means for transferring parts between any singulated and clamped tray and another location;

said method comprising the steps of detecting horizontal positioning of the transportable cart in one said cart bay; then raising one said elevator to position an uppermost tray opposite said singulator mechanism above said one cart bay, then actuating said singulating mechanism to support said trays then lowering said elevator to separate said tray from any remaining trays in that cart bay, then actuating said clamping mechanism to clamp said tray, then releasing said clamping mechanism and actuating said means to transfer said tray laterally to said other singulator and clamping mechanism, then clamping said tray at said other mechanism, then raising the other elevator to the correct height for receiving said tray from the other singulator mechanism, then retracting said other singulator mechanism to allow said other elevator to receive said tray from said singulator mechanism, then lowering said other elevator and actuating said other singulator mechanism to enable it to support the next transferred tray, and further comprising transferring of parts between any singulated and clamped tray and another location.

7. A method as recited in claim 6, where said step of transferring parts between any singulated and clamped tray and another location is carried out in a primary phase between said other location and said laterally transferred tray, and in a secondary phase between said other location and a tray which has not yet been laterally transferred, said secondary phase taking place when transfers involving said laterally transferred tray are completed and while said laterally transferred tray is being removed to said second cart bay via operation of said other elevator.

* * * * *